US00RE47073E

(19) United States
(12) Reissued Patent
Martin et al.

(10) Patent Number: US RE47,073 E
(45) Date of Reissued Patent: Oct. 2, 2018

(54) SPARK PLUG

(71) Applicant: Vomar Tech, Inc., Big Bear Lake, CA (US)

(72) Inventors: Perry D. Martin, Oak Hills, CA (US); Christopher J. Witherspoon, Apple Valley, CA (US)

(73) Assignee: Vomar Tech, Inc., Big Bear Lake, CA (US)

(21) Appl. No.: 14/176,306

(22) Filed: Feb. 10, 2014

Related U.S. Patent Documents

Reissue of:
(64) Patent No.: 8,125,130
Issued: Feb. 28, 2012
Appl. No.: 12/772,680
Filed: May 3, 2010

U.S. Applications:
(60) Provisional application No. 61/215,329, filed on May 4, 2009.

(51) Int. Cl.
*H01J 21/22* (2006.01)
*H01T 13/46* (2006.01)

(52) U.S. Cl.
CPC ..... *H01T 13/467* (2013.01)

(58) Field of Classification Search
CPC ..... H01T 13/462
USPC ..... 313/141
See application file for complete search history.

(56) References Cited

U.S. PATENT DOCUMENTS 1,272,954 A 7/1918 Horning
2,453,048 A 7/1943 Tognola et al.
2,461,590 A 12/1943 Crook
4,396,855 A * 8/1983 Imai et al. ..... 313/139
(Continued)

FOREIGN PATENT DOCUMENTS

GB 1457812 12/1976
JP S49-117848 A 11/1974
(Continued)

OTHER PUBLICATIONS

The Second Office Action issued in Chinese Patent Application No. 201080069506.8, dated Oct. 29, 2014, 5 pgs.
(Continued)

*Primary Examiner* — Matthew C Graham
(74) *Attorney, Agent, or Firm* — Jeffrey G. Sheldon; Katherine B. Sales; Cislo & Thomas LLP

(57) ABSTRACT

A spark plug has a central electrode and a plurality of peripheral electrodes. The central electrode has a proximal portion and a distal portion. The distal portion of the central electrode has a circular cross-section with a longitudinal axis and terminates in a distal end. Each peripheral electrode has a lower portion and an upper portion. Each upper portion has a distal-most point. Each distal-most point is disposed in a central plane within which the longitudinal axis of the distal portion of the central electrode is wholly disposed. The cross-section of each upper portion taken along its central plane defines a convex outer side and a non-convex inner side. Each convex outer side has a curved surface which is tangent to a plurality of tangent planes, all of which intersect the longitudinal axis of the distal portion of the central electrode at points at or above the distal end of the distal point of the central electrode.

15 Claims, 2 Drawing Sheets

"Amended"

(56) References Cited

U.S. PATENT DOCUMENTS

| | | | | |
|---|---|---|---|---|
| 4,439,707 | A | 3/1984 | Hattori | |
| 5,760,534 | A | 6/1998 | Bednar et al. | |
| 6,095,124 | A * | 8/2000 | Matsubara | H01T 13/52 123/169 EL |
| 6,335,587 | B1 * | 1/2002 | Matsubara | H01T 13/20 313/123 |
| 6,362,562 | B1 | 3/2002 | Rossi | |
| 6,583,539 | B1 | 6/2003 | Zamora | |
| 7,250,711 | B2 | 7/2007 | Koyama et al. | |
| 7,477,006 | B2 | 1/2009 | Fukuzawa et al. | |
| 2005/0127809 | A1 * | 6/2005 | Lindsay | H01T 13/39 313/141 |

FOREIGN PATENT DOCUMENTS

| | | | |
|---|---|---|---|
| JP | H07-272826 | A | 10/1995 |
| JP | 2004-022450 | A | 1/2004 |
| WO | WO2000001047 | A1 | 1/2000 |

OTHER PUBLICATIONS

International Search Report and Written Opinion, dated Jun. 17, 2011, in international application No. PCT/US2010/046386.
Extended European Search Report, dated Sep. 21, 2012, in European application No. 10854248.1.
Patent Examination Report No. 1, dated May 9, 2013, in Australian patent application No. 2010359601.
Innovation Patent Examination Report No. 1, dated May 14, 2013, in Australian patent application No. 2013100245.
Innovation Patent Examination Report No. 2, dated Oct. 4, 2013, in Australian patent application No. 2013100245.
The first Office Action issued in Japanese Patent Application No. 2013-525872 based on PCT/US2010/046386, dated Feb. 10, 2014.
Notice of Office Action issued in Korean Patent Application No. 10-2013-7007098 based on PCT/US2010/046386, dated Jan. 28, 2014.
The First Office Action issued in Chinese Patent Application No. 201080069506.8, dated Feb. 24, 2014.

* cited by examiner

"Amended"

"Amended"

SPARK PLUG

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue application of U.S. Pat. No. 8,125,130.*

RELATED APPLICATIONS

This application claims priority from Provisional Application Ser. No. 61/215,329, filed May 4, 2009, entitled "ION GUN SPARK PLUG FOR INTERNAL COMBUSTION ENGINES," the entirety of which is incorporated herein by reference.

FIELD OF THE INVENTION

The invention relates generally to spark plugs for internal combustion engines.

BACKGROUND OF THE INVENTION

Spark plugs for internal combustion engines have been known for more than 100 years. Although the design of spark plugs has improved considerably during that time, there is a continuing need for spark plugs which will further enhance engine performance and, hopefully, reduce the rate of fuel consumption.

The need for spark plugs which yield improved engine performance is especially acute in the racing industry, where even small increases in engine performance and/or small decreases in engine fuel consumption can mean the difference between winning and losing.

SUMMARY OF THE INVENTION

The invention satisfies this need. The invention is a spark plug comprising (a) a central electrode having a proximal portion and a distal portion, the distal portion having a circular cross section with a longitudinal axis and terminating in a distal end; and (b) a plurality of peripheral electrodes, each peripheral electrode having a lower portion and an upper portion and being substantially identical in shape and dimensions, each upper portion having a distal-most point, each distal-most point being disposed in a central plane within which the longitudinal axis of the distal portion of the central electrode is wholly disposed, the cross-section of each upper portion taken along its central plane defining a convex outer side and a non-convex inner side, each convex outer side having a curved surface which is tangent to a plurality of tangent planes, all of which tangent planes intersect the longitudinal axis of the distal portion of the central electrode at points at or above the distal end of the distal point of the central electrode.

DRAWINGS

These and other features, aspects and advantages of the present invention will become better understood with reference to the following description, appended claims and accompanying drawings where:

Figure 2:
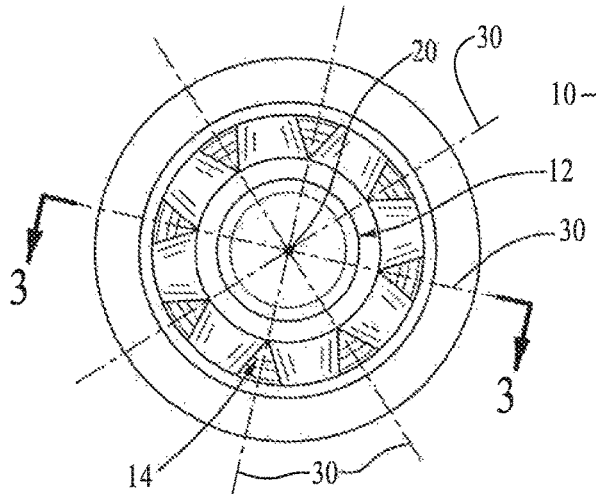
FIG. 2 is a plan view of one end of the spark plug illustrated in FIG. 1.
Figure 4A:
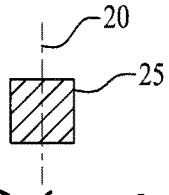
Figure 4B:
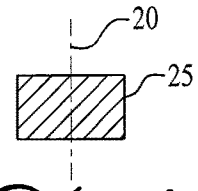
Figure 4C:
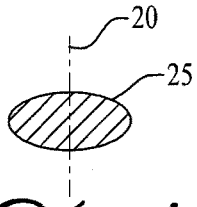
Figure 4D:
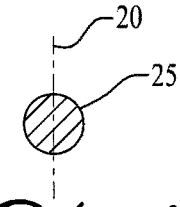
Figure 4E:
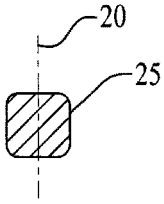
Figure 4F:
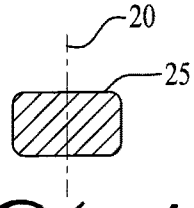
Figure 4G:
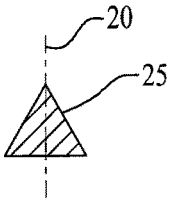
Figure 4H:
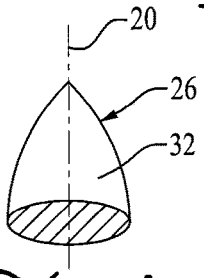
Figure 4I:
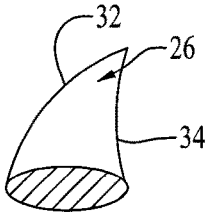
Figure 4J:
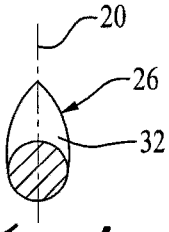
Figure 4K:
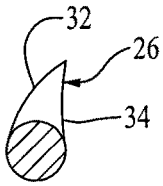
Figure 4L:
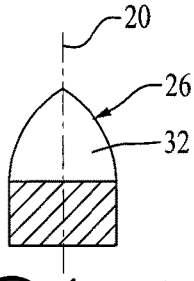
Figure 4M:
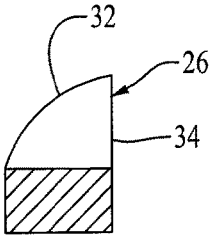
Figure 4N:
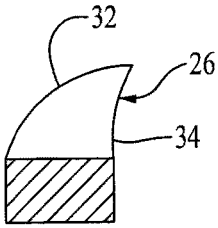

FIG. [3A] *3B* is a cross-sectional view of the spark plug illustrated in FIG. 2, taken along line 3-3;

FIG. [3B] *3A* is an alternative cross-sectional view of the spark plug illustrated in FIG. 2, [take] *taken* along line 3-3;

FIG. 4A is diagrammatic illustration of a first lower portion of a peripheral electrode useable in the invention;

FIG. 4B is a diagrammatic illustration of a second lower portion of a peripheral electrode useable in the invention;

FIG. 4C is a diagrammatic illustration of a third lower portion of a peripheral electrode useable in the invention;

FIG. 4D is a diagrammatic illustration of a fourth lower portion of a peripheral electrode useable in the invention;

FIG. 4E is a diagrammatic illustration of a fifth lower portion of a peripheral electrode useable in the invention;

FIG. 4F is a diagrammatic illustration of a sixth lower portion of a peripheral electrode useable in the invention;

FIG. 4G is a diagrammatic illustration of a seventh lower portion of a peripheral electrode useable in the invention;

FIG. 4H is a diagrammatic illustration of an eighth lower portion of a peripheral electrode useable in the invention;

FIG. 4I is a side view of the lower portion of the peripheral electrode illustrated in FIG. 4H;

FIG. 4J is a diagrammatic illustration of an ninth lower portion of a peripheral electrode useable in the invention;

FIG. 4K is a side view of the lower portion of the peripheral electrode illustrated in FIG. 4J;

FIG. 4L is a diagrammatic illustration of a tenth lower portion of a peripheral electrode useable in the invention;

FIG. 4M is a side view of the lower portion of the peripheral electrode illustrated in FIG. 4L;

FIG. 4N is an alternative side view of the lower portion of the peripheral electrode illustrated in FIG. 4L.

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

As used herein, except where the context requires otherwise, the term "comprise" and variations of the term, such as "comprising," "comprises" and "comprised" are not intended to exclude other additives, components, integers or steps. Thus, throughout this specification, unless the context requires otherwise, the words "comprise", "comprising" and the like, are to be construed in an inclusive sense as opposed to an exclusive sense, that is to say, in the sense of "including, but not limited to".

As depicted in the figures, all dimensions specified in this disclosure are by way of example only and are not intended to be limiting. Further, the proportions shown in these figures are not necessarily to scale. As will be understood by those with skill in the art with reference to this disclosure, the actual dimensions of any device or part of a device disclosed in this disclosure will be determined by its intended use.

Figure 1:
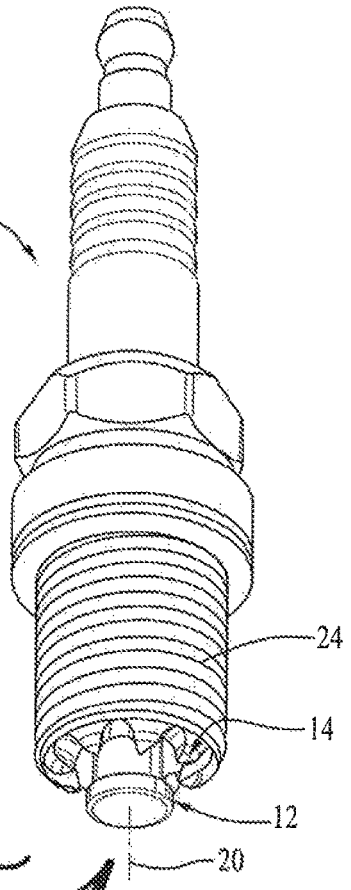
FIG. 1 is a perspective view of a spark plug having features of the invention.

The invention is a spark plug 10 for an internal combustion engine which is capable of providing extraordinary performance. The spark plug 10 comprises a central electrode 12 and a plurality of peripheral electrodes 14. The invention is illustrated in FIGS. 1-3.

Figure 3A:
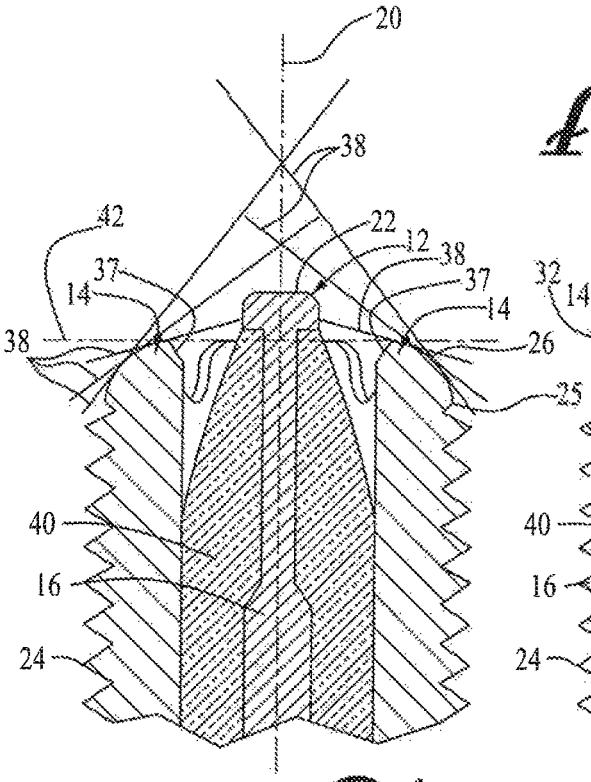
Figure 3B:
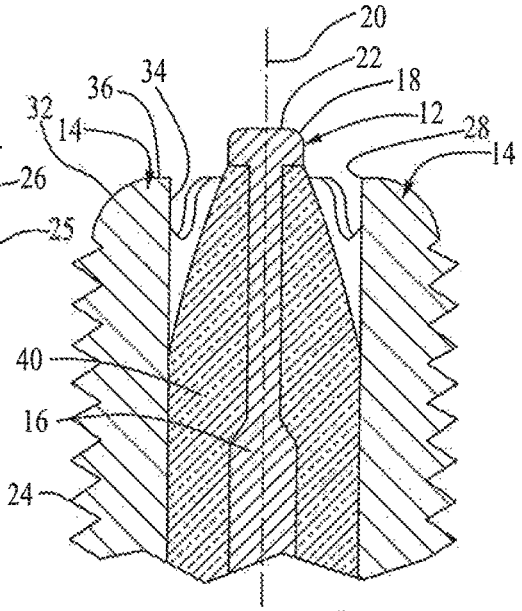

The central electrode 12 has a proximal portion 16 and a distal portion 18 *both disposed along a longitudinal axis 20 as illustrated in FIGS. 3A and 3B*. The distal portion 18 has a circular cross-section [with a longitudinal axis 20]. The distal portion 18 terminates at a distal end 22. In one embodiment, the distal end 22 of the central electrode 12 [is dome-shaped] *has rounded edges* for a congruous blunt shape. For ease of manufacturing, the central electrode 12 is cylindrical as with a typical spark plug.

In a preferred embodiment, the diameter of the distal portion 18 is between about 0.125 inches and about 0.265 inches. This diameter of the distal portion 18 is about two to three times larger than in a typical spark plug. The central electrode 12 is enlarged for several reasons. One purpose is for spark stabilization. The enlarged electrode stores up more energy, thereby releasing a greater amount of electricity at the spark event. A second purpose is to cause continuous rapid ion movement during the ignition cycle that will not break down, even under extreme combustion pressure, as with racing engines.

The plurality of peripheral electrodes 14 are disposed equidistant from one another around the central electrode 12 so as to define a circle having the central electrode 12 disposed at its center. The peripheral electrodes 14 are typically integral with a threaded base cylinder 24. In the embodiment illustrated in the drawings, the plurality of peripheral electrodes 14 constitutes 8 peripheral electrodes 14. In all cases, it is important that the number of peripheral electrodes 14 is between about 3 and about 12. When the number of peripheral electrodes 14 is less than 3 or greater than 12, performance in an internal combustion engine is markedly reduced.

Each of the peripheral electrodes 14 is substantially identical in shape and dimensions. Each peripheral electrode 14 has a lower portion 25 and an upper portion 26. The upper portion 26 has a distal-most point 28. As illustrated in FIGS. 1 and 2, the distal-most point 28 of each of the peripheral electrodes 14 can be relatively sharp. However, in other embodiments, the distal-most point 28 of each of the peripheral electrodes 14 may be more rounded or flat.

*In the embodiments illustrated in FIGS. 1, 2, 3A and 3B, the upper portion 26 of each peripheral electrode 14 converges to the distal-most point 28, and, when viewed from the end of the spark plug 10 (as in FIG. 2), appears triangular in shape.*

As illustrated in FIG. 2, each distal-most point 28 is disposed in a central plane 30 within which the longitudinal axis 20 of the distal portion 18 of the central electrode 12 is wholly disposed. The cross-section of each upper portion 26 of each of the peripheral electrodes 14, taken along its central plane 30, defines a convex outer side 32 and a non-convex inner side 34.

As illustrated in FIG. 3A, each convex outer side 32 has a curved surface 36 which is tangent to a plurality of tangent planes 38, all of which tangent planes 38 intersect the longitudinal axis 20 of the distal portion 18 of the central electrode 12 at points at or above the distal end 22 of the distal point of the central electrode 12. In a typical embodiment, the curved surface 36 of the convex outer side 32 is smooth with preferably no discontinuities. *As shown in FIG. 3A, a first end of the flat section of each electrode at the upper portion 26 closest to the distal-most point 28 is further away from the central electrode than a second end of the flat section of each electrode closest to the lower portion 25.*

FIG. 3B illustrates an alternative cross-sectional view identical to that which is illustrated in FIG. 3A, except that the inner side 34 [defines a small flat section 37 near the distal-most point 28] *of each peripheral electrode does not have a flat section 37 and is defined by the inner surface of the threaded base cylinder 24*.

By the aforementioned design, the plurality of peripheral electrodes 14 resembles a fork that has been bent into a loop with the tines arcing inwards to point at the central electrode 12.

As also illustrated in [FIG. 3] *FIGS. 3A and 3B*, the peripheral electrodes 14 are electrically insulated from the central electrode 12 by a layer of bakelite 40 or other suitable insulator. *As seen in FIGS. 3A and 3B, the peripheral electrodes 14 are disposed in a plane that intersects the insulator 40 below the distal portion of the central electrode.*

As illustrated in FIGS. 4A-4M, the peripheral electrodes 14 can be provided in a variety of shapes. FIG. 4A illustrates the cross-sectional shape of the lower portion 25 of a peripheral electrode 14 having a generally square cross-section. FIG. 4B illustrates the lower portion 25 of a peripheral electrode 14 having a generally rectangular cross-section. FIG. 4C illustrates the lower portion 25 of a peripheral electrode 14 having a generally oval shape. FIG. 4D illustrates the lower portion 25 of a peripheral electrode 14 having a generally circular shape. FIG. 4E illustrates the lower portion 25 of a peripheral electrode 14 having a generally square shape but with rounded corners. FIG. 4F illustrates the lower portion 25 of a peripheral electrode 14 having a generally rectangular cross-section, but with rounded corners. FIG. 4G illustrates the lower portion 25 of a peripheral electrode 14 having a generally triangular cross-section.

FIGS. 4H and 4I illustrates the upper portion 26 of a peripheral electrode 14 having the shape of an eccentric cone. Similarly, FIGS. 4J and 4K illustrate the upper portion 26 of a peripheral electrode 14 having a shape of an alternative eccentric cone.

FIGS. 4L and 4M illustrate the upper portion 26 of a peripheral electrode 14 having a generally flat inner side 34 and an outer side 32 which in cross-section taken along its central plane 30, the inner side 34 has a generally flat surface and the outer side 32 has a surface having the shape of a circular arc.

FIG. 4N illustrates the cross-section of an alternative upper portion 26 of the peripheral electrode 14 illustrated in FIG. 4L wherein the inner side 34 is somewhat concave.

Typically, the distal-most point 28 of each of the peripheral electrodes 14 is spaced apart from the central electrode 12 by a distance of between about 0.04 inches and about 0.095 inches, most typically between about 0.05 inches and about 0.07 inches.

By the above-described unique design of the spark plug 10 of the invention, the spark plug 10 is capable of providing improved engine performance, including the increasing of horsepower and torque, by utilizing the excess energy from an ignition source to cause rapid ion movement that mixes with the incoming air/fuel in the combustion chamber. A blast of negative ions is mixed into the air fuel in the combustion chamber just prior to ignition, during the spark event and during combustion. This blast of ions changes the burn characteristics of the fuel by releasing more potential energy and slowing down the actual combustion event. This phenomenon is similar to raising the octane level of the fuel. During the firing event ions are cooling the tips. This event often results in rapid circular flow around the central electrode.

This phenomenon has the further advantage that the spark plug of the invention need not be designed for one of a large number of specific heat ranges. For most applications, only one heat range is required. In contrast, with conventional spark plugs, as many as 20 different designs are required, one for a different heat range.

By the design of the peripheral electrodes in the invention, negative ions are separated out of the electrical charge flowing from the coil. The ions travel along the periphery of the negative electrodes, building momentum along the curves of the peripheral electrodes culminating at the distal portion and then blasting a pathway toward the center electrode for the spark plasma to travel. As the piston nears top dead center of the compression/combustion stroke the combustion chamber becomes highly pressurized. In this atmosphere the spark plasma is amplified and split so a plurality of sparks are emitted from the variety of the ground electrodes. As many as three distinct, highly energized spark kernels have been observed during high pressure testing.

The rapid ion movement impacts upon the central electrode and splays out into the air/fuel charge, heavily ionizing said charge before, during and shortly after the spark event. Thus fully utilizing, completely, the electrical charge provided by the coil.

Another phenomenon that occurs in the use of the invention is that the moving ions create a pressure shield beneath the central electrode and in the cavity between the insulator and the inner wall of the base shell. This pressure shield keeps carbon from partially burnt fuel and oil from contaminating the insulator and the inner wall of the base shell, thus avoiding potential shorting of the spark.

After ignition, the rapid ion movement cools down the flame front, thus slowing down the combustion event. This rapid ion movement process causes an increased duration of pressure on the descending piston top. This rapid ion movement combustion process also ensures a more complete burn, thus lowering the percentage of unburned hydrocarbons.

Another positive benefit concerning emissions is that the cooling aspect of the rapid ion movement keeps the $NO_x$ from rising. This is contrasted with conventional spark plugs wherein a higher heat range must be utilized to burn more hydrocarbons (and such higher heat necessarily produces more $NO_x$).

Finally, the design of the invention also produces a very strong and stable spark that can jump large spark gaps and under extreme combustion pressure, thereby greatly reducing misfires.

EXAMPLES

Dynometer charts are re-produced utilizing a high performance V-8 test engine. These tests were conducted by an independent facility. No changes or alterations were made to the engine with the exception of the changing of spark plugs.

These charts demonstrate the increase in horsepower and torque achieved by the sparkplug of the invention compared to a typical racing spark plug of the prior art.

Example 1

In this example, the engine for testing was a 420 cubic inch Ford FE engine with an 850 cfm Holly carburetor and 38 degrees of timing. The stock spark plugs were Autolite 3924 stock plugs set at a gap of 0.040 inches. The spark plugs of the invention were Autolite 3924 stock plugs modified as illustrated in FIG. 1, with a gap of 0.058 inches.

| | Stock Plug | | Invention Plug | |
|---|---|---|---|---|
| RPM | Trq | Pwr | Trq | Pwr |
| 3900 | 470.7 | 349.5 | 462.7 | 343.6 |
| 4000 | 505.1 | 384.7 | 503.5 | 383.4 |
| 4100 | 500.6 | 390.8 | 505.5 | 394.6 |
| 4200 | 499.8 | 399.7 | 507.6 | 405.9 |
| 4300 | 499.5 | 408.9 | 503.7 | 412.4 |
| 4400 | 498.2 | 417.4 | 501.8 | 420.4 |
| 4500 | 502.0 | 430.1 | 508.3 | 435.5 |
| 4600 | 512.8 | 449.2 | 511.9 | 448.3 |
| 4700 | 516.2 | 461.9 | 523.0 | 468.0 |
| 4800 | 514.9 | 470.6 | 522.0 | 477.1 |
| 4900 | 519.0 | 484.2 | 521.7 | 486.7 |
| 5000 | 518.8 | 493.9 | 525.4 | 500.2 |
| 5100 | 520.9 | 505.8 | 522.4 | 507.3 |
| 5200 | 523.2 | 518.0 | 520.5 | 515.3 |
| 5300 | 519.4 | 524.1 | 524.3 | 529.1 |
| 5400 | 514.2 | 528.7 | 521.4 | 536.1 |
| 5500 | 514.3 | 538.6 | 518.6 | 543.1 |
| 5600 | 505.6 | 539.1 | 511.7 | 545.6 |
| 5700 | 500.0 | 542.6 | 501.6 | 544.4 |
| 5800 | 493.5 | 545.0 | 493.1 | 544.6 |
| 5900 | 483.5 | 543.1 | 487.0 | 547.1 |
| 6000 | 476.6 | 544.5 | 481.6 | 550.1 |
| 6100 | 471.4 | 547.5 | 469.4 | 545.2 |
| 6200 | 462.3 | 545.8 | 462.2 | 545.6 |
| 6300 | 452.7 | 543.0 | 458.0 | 549.4 |
| 6400 | 447.3 | 545.1 | 446.5 | 544.1 |
| 6500 | 437.6 | 541.6 | 435.8 | 539.3 |

Example 2

The engine for testing was an 812 cubic inch Ford engine with an 850 cfm Holly carburetor and 38 degrees of timing. The stock spark plugs were Autolite 3924 stock plugs set at a gap of 0.45 inches. The spark plugs of the invention were Autolite 3924 stock plugs modified as illustrated in FIG. 1, with a gap of 0.062 inches. In Example 2, two tests were run with the spark plugs of the invention.

| | Stock | | Invention 1 | | Invention 2 | |
|---|---|---|---|---|---|---|
| RPM | Trq | Pwr | Trq | Pwr | Trq | Pwr |
| 4000 | 495.9 | 377.6 | 496.6 | 378.2 | 506.0 | 385.4 |
| 4100 | 505.4 | 394.5 | 496.9 | 387.9 | 504.1 | 393.5 |
| 4200 | 503.5 | 402.6 | 501.1 | 400.7 | 505.0 | 403.8 |
| 4300 | 506.1 | 414.4 | 498.9 | 408.5 | 511.2 | 418.6 |
| 4400 | 511.9 | 428.9 | 508.8 | 426.2 | 510.0 | 427.2 |
| 4500 | 513.5 | 440.0 | 514.4 | 440.7 | 511.4 | 438.2 |
| 4600 | 512.3 | 448.7 | 515.4 | 451.5 | 517.6 | 453.3 |
| 4700 | 523.3 | 468.3 | 519.4 | 464.8 | 526.2 | 470.9 |
| 4800 | 530.2 | 484.6 | 531.2 | 485.4 | 527.9 | 482.4 |
| 4900 | 528.6 | 493.2 | 529.7 | 494.2 | 527.1 | 491.8 |
| 5000 | 534.2 | 508.6 | 533.3 | 507.8 | 530.1 | 504.7 |
| 5100 | 530.9 | 515.5 | 531.4 | 516.1 | 532.9 | 517.5 |
| 5200 | 529.5 | 524.2 | 533.9 | 528.6 | 529.6 | 524.4 |
| 5300 | 524.1 | 528.9 | 528.1 | 532.9 | 526.9 | 531.7 |
| 5400 | 520.1 | 534.8 | 523.2 | 538.0 | 522.4 | 537.1 |
| 5500 | 519.2 | 543.7 | 523.2 | 547.9 | 517.8 | 542.2 |
| 5600 | 512.7 | 546.7 | 518.7 | 553.0 | 505.9 | 539.4 |
| 5700 | 498.7 | 541.3 | 511.1 | 554.7 | 503.7 | 546.7 |
| 5800 | 497.3 | 549.2 | 502.7 | 555.1 | 495.6 | 547.4 |
| 5900 | 494.1 | 555.0 | 493.6 | 554.4 | 492.8 | 553.6 |
| 6000 | 483.7 | 552.6 | 488.8 | 557.9 | 489.3 | 559.0 |

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A spark plug comprising:

(*a*) *a threaded cylindrical body;*

[(a)] (*b*) a central electrode *disposed within the cylindrical body along a central axis of the cylindrical body, the central electrode* having a proximal portion and a distal portion, *the proximal portion of the central electrode surrounded by an insulating material,* the distal portion *extending beyond the insulating material and* having a circular cross section [with a longitudinal axis] *having a circumference centered about the central axis* and terminating in a distal end;

[(b)] (*c*) *an upper end of the cylindrical body terminating in* a plurality of peripheral electrodes *radially disposed around the central electrode and equally spaced apart from one another*, each peripheral electrode [having a lower portion and an upper portion and] being substantially identical in shape and dimensions, *each peripheral electrode having an upper portion and a lower portion,* each upper portion [having] *converging to* a distal-most point[, each distal-most point being] disposed in a [central] plane [within which the longitudinal axis of the distal portion of the central electrode is wholly disposed, the cross-section of] *that intersects the insulating material below the distal portion of the central electrode,* each upper portion [taken along its central plane] defining a convex outer [side] *surface* and a [non-convex] inner [side] *surface*, [each convex outer side having a curved surface which is tangent to a plurality of tangent planes, all of which tangent planes intersect the longitudinal axis of the distal portion of the central electrode at points at or above the distal end of the distal point of the central electrode] *the inner surfaces of all of the peripheral electrodes being integral with and one piece with the cylindrical body, the inner surface of each peripheral electrode terminating in a flat section at a distal end thereof, the flat section lying in an inclined plane, a distal end of the flat section being further away from the central electrode than a proximal end of the flat section.*

2. The spark plug of claim 1 wherein the distal portion of the central electrode has a diameter between about 0.125 inches and about 0.265 inches.

3. The spark plug of claim 1 wherein *the distal end of* the central electrode [has a distal end which is dome-shaped] *comprises rounded edges.*

4. The spark plug of claim 1 wherein the number of the plurality of peripheral electrodes is between about 3 and about 12 peripheral electrodes.

5. The spark plug of claim 1 wherein the lower portion of each of the peripheral electrodes has a square cross-section.

6. The spark plug of claim 1 wherein the lower portion of each of the peripheral electrodes has a rectangular cross-section.

7. The spark plug of claim 1 wherein the lower portion of each of the peripheral electrodes has a generally oval cross-section.

8. The spark plug of claim 1 wherein the lower portion of each of the peripheral electrodes has a circular cross-section.

9. The spark plug of claim 1 wherein the lower portion of each of the peripheral electrodes has a generally square cross-section with rounded corners.

10. The spark plug of claim 1 wherein the lower portion of each of the peripheral electrodes has a generally rectangular cross-section with rounded corners.

11. The spark plug of claim 1 wherein the lower portion of each of the peripheral electrodes has a generally triangular cross-section with rounded corners.

12. The spark plug of claim 1 wherein the upper portion of each of the peripheral electrodes has the shape of an eccentric cone.

13. The spark plug of claim 1 wherein the convex outer [side] *surface* is smooth.

14. The spark plug of claim 13 wherein the convex outer [side] *surface* forms an arc of a circle.

*15. The spark plug of claim 1 wherein the distal end of the central electrode has a diameter substantially equal to the diameter of a distal end of the insulating material.*

* * * * *